(12) United States Patent
Hacker et al.

(10) Patent No.: US 10,584,247 B2
(45) Date of Patent: Mar. 10, 2020

(54) METHODS FOR REDUCING ASPHALT PAVEMENT THICKNESS

(71) Applicant: Honeywell International Inc., Morristown, NJ (US)

(72) Inventors: Scott Hacker, River Edge, NJ (US); Cynthia Kostelansky, Morristown, NJ (US); Yonghong Ruan, Wayne, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 604 days.

(21) Appl. No.: 14/096,873

(22) Filed: Dec. 4, 2013

(65) Prior Publication Data

US 2014/0186116 A1 Jul. 3, 2014

Related U.S. Application Data

(60) Provisional application No. 61/746,750, filed on Dec. 28, 2012.

(51) Int. Cl.
| | |
|---|---|
| *E01C 7/30* | (2006.01) |
| *C08L 95/00* | (2006.01) |
| *C08L 23/30* | (2006.01) |
| *E01C 7/18* | (2006.01) |

(52) U.S. Cl.
CPC ............. *C08L 95/00* (2013.01); *C08L 23/30* (2013.01); *E01C 7/18* (2013.01); *E01C 7/30* (2013.01); *C08L 2555/22* (2013.01); *C08L 2555/52* (2013.01); *C08L 2555/86* (2013.01)

(58) Field of Classification Search
CPC ............ E01C 7/182; E01C 7/30; C08L 95/00
USPC ........................................ 404/72, 75; 524/59
See application file for complete search history.

(56) References Cited

U.S. PATENT DOCUMENTS

| | | | |
|---|---|---|---|
| 4,496,622 A * | 1/1985 | Chang et al. | 442/59 |
| 4,497,921 A * | 2/1985 | Chang et al. | 524/59 |
| 4,537,922 A * | 8/1985 | Chang et al. | 524/82 |
| 5,302,638 A | 4/1994 | Ho et al. | |
| 5,432,213 A | 7/1995 | Kim et al. | |
| 6,000,877 A | 12/1999 | Fishback et al. | |
| 6,057,390 A | 5/2000 | Loza et al. | |
| 6,074,469 A | 6/2000 | Collins et al. | |
| 6,136,898 A | 10/2000 | Loza et al. | |
| 6,281,273 B1 * | 8/2001 | Ando et al. | 524/68 |
| 6,358,621 B1 * | 3/2002 | Hughes et al. | 428/489 |
| 6,414,056 B1 | 7/2002 | Puzic et al. | |
| 6,866,712 B1 | 3/2005 | Rossi et al. | |
| 7,144,933 B2 * | 12/2006 | Stuart et al. | 524/68 |
| 7,202,290 B2 | 4/2007 | Stuart, Jr. et al. | |
| 7,297,204 B2 | 11/2007 | Crews et al. | |
| 7,439,286 B2 | 10/2008 | Stuart, Jr. et al. | |
| 7,534,068 B2 | 5/2009 | Brouillette et al. | |
| 7,745,518 B2 | 6/2010 | Scholten | |
| 7,981,466 B2 | 7/2011 | Reinke et al. | |
| 8,138,242 B2 * | 3/2012 | Reinke | C08L 95/00 106/273.1 |
| 8,198,350 B2 | 6/2012 | Fee et al. | |
| 8,382,890 B2 | 2/2013 | Barreto et al. | |
| 8,470,437 B2 | 6/2013 | Yi | |
| 8,658,717 B2 * | 2/2014 | Rotz et al. | 524/59 |
| 8,722,776 B2 | 5/2014 | Chaverot et al. | |
| 2005/0101702 A1 | 5/2005 | Stuart, Jr. et al. | |
| 2006/0106138 A1 | 5/2006 | Trommelen et al. | |
| 2006/0223916 A1 | 10/2006 | Stuart, Jr. et al. | |
| 2009/0054562 A1 | 2/2009 | Martin | |
| 2011/0020537 A1 | 1/2011 | Reinke, II et al. | |
| 2011/0196073 A1 | 8/2011 | Fee et al. | |
| 2011/0269876 A1 | 11/2011 | Rowe et al. | |
| 2012/0167802 A1 | 7/2012 | Huh | |
| 2012/0196959 A1 | 8/2012 | Rotz et al. | |
| 2012/0219811 A1 | 8/2012 | Scholten et al. | |
| 2012/0225979 A1 | 9/2012 | Naidoo et al. | |
| 2012/0252939 A1 * | 10/2012 | Hacker et al. | 524/69 |
| 2013/0172452 A1 * | 7/2013 | Corcoran et al. | 524/68 |

FOREIGN PATENT DOCUMENTS

| | | |
|---|---|---|
| CA | 2433789 A1 | 7/2002 |
| CA | 2354750 A1 | 2/2003 |
| CN | 1087614 A | 6/1994 |
| CN | 1142516 A | 2/1997 |
| CN | 1305513 A | 7/2001 |
| CN | 1364150 A | 8/2002 |
| CN | 1942525 A | 4/2007 |
| CN | 101730722 A | 6/2010 |
| CN | 101796076 A | 8/2010 |
| CN | 101974235 A | 2/2011 |
| CN | 102337036 A | 2/2012 |
| EP | 424213 A1 | 4/1991 |

(Continued)

OTHER PUBLICATIONS

International Search Report dated Mar. 6, 2014 in International Application No. PCT/US2013/073973.
Zhang P., et al., "Rubber Modified Asphalt Mixture Properties and Mechanical Testing", Applied Mechanics and Materials, vol. 105-107, 2012, pp. 810-817.
Jeong, K.D., et al., "Laboratory Evaluation of Flexible Pavement Materials Containing Wate Polyethylene (WPE) film", Construction and Building Materials, vol. 25, Issue 4, Apr. 2011, pp. 1890-1894.
Singh, B., et al., "Polymer-Modified Bitumen of Recycled LDPE and Maleated Bitumen", Journal of Applied Polymer Science, vol. 127, Issue 1, Jan. 5, 2013, pp. 67-78.

(Continued)

*Primary Examiner* — Gary S Hartmann
(74) *Attorney, Agent, or Firm* — Lorenz & Kopf, LLP

(57) ABSTRACT

Methods for reducing asphalt pavement thickness are provided. A method for producing thin asphalt pavement includes combining a base asphalt, an oxidized polyolefin, and an aggregate to form an asphalt paving material. A layer of the asphalt paving material is deposited on a substrate layer and compacted to a thickness.

10 Claims, 4 Drawing Sheets

(56) References Cited

FOREIGN PATENT DOCUMENTS

| | | |
|---|---|---|
| EP | 837185 A1 | 4/1998 |
| EP | 1097969 A1 | 5/2001 |
| EP | 2213704 A1 | 8/2010 |
| JP | 2002121388 A | 4/2002 |
| JP | 2006188814 A | 7/2006 |
| KR | 1171338 B1 | 8/2012 |
| RU | 2297990 C1 | 4/2007 |
| RU | 2303575 C2 | 7/2007 |
| WO | 2006107179 A2 | 10/2006 |
| WO | 2011145928 A1 | 11/2011 |
| WO | 2012103206 A2 | 8/2012 |

OTHER PUBLICATIONS

Shang, L., et al, "Pyrolyzed Wax From Recycled Cross-Linked Polyethylene as Warm Mix Asphalt (WMA) Additive for SBS Modified Asphalt", Construction and Building Materials, vol. 25, Issue 2, Feb. 2011, pp. 886-891.

Kumar,P., et al, "Strength Characteristics of Polymer Modified Mixes", International Journal of Pavement Engineering, vol. 7, Issue 1, Mar. 2006, pp. 63-71.

Kim, K.W., et al., "Fracture Toughness of Polymer-Modified Asphalt Concrete at Low Temperatures", Canadian Journal of Civil Engineering, vol. 30, Issue 2, Apr. 2003, pp. 406-413.

Gao, G., et al., "Enhanced Performance of LDPE/SBS Blend Modified Asphalt Through Dynamic Vulcanization", Polymers and Polymer Composites, vol. 10, Issue 6, 2002, pp. 433-440.

Gao, G., et al. "Improved Storage Stability of LDPE/SBS Blends Modified Asphalts", Polymers and Polymer Composites, vol. 10, Issue 3, 2002, pp. 229-236.

Wardlaw K., et al. "Symposium on Polymer Modified Asphalt Binders," ASTM, May 1992.

Anonymous, "Mechanistic-Empirical Pavement Design Guide; MEPDG-1; A Manual of Practice", Jul. 1, 2008, pp. 1-218, XP055292804, 444 North Capitol St., NW Suite 249, Washington, DC 20001, ISBN: 978-1-56051-423-7.

Supplementary European Search Report dated Aug. 3, 2016 in EP Application No. 13869112.

Chinese Office Action for Patent Application No. 201380068515.9 dated Jan. 16, 2017.

Japanese Office Action for Patent Application No. 2015-550429 dated Mar. 23, 2018.

Li et al., Mechanistic-empirical Pavement Design Guide (MEPDG): A Bird's-eye View. Journal of Modern Transportation, Jun. 2011, pp. 114-133, 19(2).

Marasteanu et al., Investigation of Low Temperature Cracking in Asphalt Pavements National Pooled Fund Study—Phase II (Final Report 2012-23), Aug. 2012 (Aug. 1, 2012), pp. 1-377, Retrieved from Internet: URS:https://www.lrrb.org/media/reports/201223.pdf [retrived on Jul. 23, 2019], Minnesota, USA.

Bahia et al., Asphalt Thermal Cracking Analyser (ATCA) In: 7th RILEM International Conference on Cracking in Pavements, Jan. 2012, pp. 147-156, Springer Netherlands, Dordrecht.

Anderson et al., Relationship of Superpave Gyratory Compaction Properties to HMA Rutting Behavior, NCHRP Report 478, National Cooperative Highway Research Program, Jan. 2002 (2002—pp. 1-70, Retrieved from the Internet: URL:http://onlinepubs.trb.org/onlinepubs/nchrp/nchrp_rpt_478.pdf [retrieved on Jul. 23, 2019], Washington DC, USA.

Sefidmazgi, Defining Effective Aggregate Skeleton in Asphalt Mixture Using Digital Imaging (Thesis) Jan. 2011, Retrieved from the Internet: URL:https://pdfs.semanticscholar.org/1837/757a940b76b1564ac22589ac3f5d56a9ab6c.pdf [retrieved on Jul. 23, 2019], Madison, USA.

Sefidmazgi et al., Internal Structure Characterization of Asphalt Mixtures for Rutting Performance Using Imaging Analysis, Road Materials and Pavement Design, Jun. 2012, pp. 21-37, 13(1).

Coenen et al., Aggregate Structure Characterisation of Asphalt Mixtures Using Two-Dimensional Image Analysis, Road Materials and Pavement Design, Jun. 2012, pp. 21-37, 13(1).

Japanese Office Action for Patent Application No. 2015-550429 dated Oct. 17, 2017.

Russian Office Action for Patent Application No. 2015129988 dated Oct. 2, 2017.

Karoonsoontawong et al., Cost-Effectiveness Analysis Of Enhancing The Pavement-Related Information Systems At The Texas Department Of Transportation Research Report 04/0-4186-2, Oct. 2003, pp. 1-94, Austin, TX.

Ying Xu et al., Life Cycle Costs Analysis of Perpetual Asphalt Pavement, Management And Service Science, 2009. Mass '09 International Conference On IEEE, Sep. 2009 pp. 1-5, Piscataway, NJ.

Anonymous, Better Faster Lower Cost, A Performance Report Of The Wisconsin Department Of Transportation, Jan. 2015, pp. 1-20.

Ormel, Modelling Asphalt With Discrete And Continuum Methods (Thesis), Aug. 14, 2012, pp. 1-94, Enschede, The Netherlands.

* cited by examiner

METHODS FOR REDUCING ASPHALT PAVEMENT THICKNESS

TECHNICAL FIELD

The technical field generally relates to methods for forming asphalt paving materials, and more particularly relates to methods for reducing asphalt pavement thickness, increasing the total number of aggregate-to-aggregate contact points of asphalt paving materials, and improving low temperature cracking performance of asphalt paving material.

BACKGROUND

Asphalt is commonly used as a paving material for road construction and maintenance. Typically, asphalt, often referred to as "asphalt binder" or "asphalt cement," is mixed with aggregate to form material used in asphalt paving. Processing and use of this material by paving crews yields asphalt pavement. The asphalt pavement comprises aggregate held within a continuous phase of the asphalt binder by adherence of the asphalt binder to the aggregate.

The strength and durability of the asphalt pavement depends on various factors such as the properties of the materials used, the interaction of the various materials, the mix design, construction practices and the environment and traffic conditions to which the pavement is exposed. To produce a mix that will have good performance during the lifetime of the pavement, it is important to attain proper coating of the aggregate with the asphalt with the optimum asphalt binder film thickness, good adhesion of the asphalt onto the aggregate, and good cohesive strength of the asphalt.

Conventional pavements suffer from various types of distress modes such as permanent deformation. Permanent deformation is a significant problem for asphalt pavement. A road may be about 80 to 100° F. or more warmer in the summer than it is in the winter. At warmer temperatures, asphalt pavement softens and can creep and move creating ridges and ruts, often referred to as "rutting," under the weight of heavy trucks passing over it or traffic that has temporarily stopped, such as, for example, at a traffic light intersection, since rutting is dependent on both the weight of the vehicle and the time duration of the weight application. To reduce or prevent rutting, polymers or other materials having a relatively higher modulus than the asphalt, or that can produce a higher modulus asphalt binder at warmer temperatures than the asphalt, are often incorporated into conventional asphalt binders. Typical polymers used to modify asphalt binders to reduce or prevent rutting include elastomers, such as, for example, styrene/butadiene/styrene copolymer (SBS), and plastomers, such as, for example, polyethylene, ethylene-vinyl acetate copolymer (EVA), and the like.

Roads consisting of asphalt pavement are typically comprised of three layers. The first layer is a course of granular material or aggregate. The second layer, called the base course, is comprised of asphalt and aggregates. The top course, or the wearing course, is also comprised of asphalt and aggregates on which automobiles and trucks drive. Optionally, a course between the base course and the wearing course, called the binder course, is sometimes used. The base course is the thickest and most expensive layer to pave. The top layer is exposed directly to the traffic and weather conditions and is the layer most subject to distress. When sufficient cracking or rutting has occurred this layer is removed and repaved leaving the base course intact provided that no cracking or rutting has occurred in this layer. If this base course layer can no longer adequately carry the load, it must be replaced at considerable cost in terms of time and money.

Accordingly, it is desirable to provide methods for fabricating a substantially thinner, and thus more economical, pavement layers that still have adequate resistance to fatigue cracking and rutting. In addition, it is desirable to provide methods for fabricating an asphalt paving material that has more aggregate to aggregate contact. It also is desirable to provide methods for fabricating asphalt pavement material with improved low temperature cracking performance. Furthermore, other desirable features and characteristics of the present invention will become apparent from the subsequent detailed description of the invention and the appended claims, taken in conjunction with the accompanying drawings and this background of the invention.

BRIEF SUMMARY

Methods for reducing asphalt pavement thickness, for fabricating asphalt paving material with increased aggregate-to-aggregate contact points, and for fabricating asphalt paving materials with improved low temperature cracking performance are provided. In accordance with an exemplary embodiment, a method for reducing asphalt pavement thickness includes combining a base asphalt, an oxidized polyolefin, and an aggregate to form an asphalt paving material. A layer of the asphalt paving material is deposited on a substrate layer and compacted to a thickness that is less than a thickness of a compacted asphalt paving material formed of the aggregate and the base asphalt with no oxidized polyolefin while achieving the same amount or less of high temperature rutting than the compacted asphalt paving material formed of the aggregate and the base asphalt with no oxidized polyolefin.

In accordance with another exemplary embodiment, a method for increasing a number of aggregate-to-aggregate contact points in an asphalt paving material is provided. The method includes preparing an asphalt binder by mixing a base asphalt with about 0.25 to about 10 wt. % of an oxidized polyolefin based on the total weight of the asphalt binder. About 3 to about 8 wt. % of the asphalt binder is mixed with about 92 to about 97 wt. % aggregate to form the asphalt paving material. A layer of the asphalt paving material is deposited on a substrate layer and compacted. The mixing comprises mixing an amount of the oxidized polyolefin such that the number of aggregate-to-aggregate contact points of the compacted asphalt paving material is greater than the number of aggregate-to-aggregate contact points of the compacted asphalt paving material formed of the aggregate and the asphalt binder having no oxidized polyethylene while achieving the same amount or less of rutting than the asphalt paving material formed of the aggregate and the asphalt binder having no oxidized polyolefin.

In accordance with a further embodiment, a method for improving low temperature cracking performance of an asphalt paving material is provided. The method includes preparing an asphalt binder by mixing a base asphalt with about 0.25 to about 10 wt. % of an oxidized polyolefin based on the total weight of the asphalt binder. About 3 to about 8 wt. % of the asphalt binder is mixed with about 92 to about 97 wt. % aggregate to form the asphalt paving material. A layer of the asphalt paving material is deposited on a substrate layer and compacted. The mixing comprises mixing an amount of oxidized polyolefin such that the compacted asphalt paving material has an average tensile strength greater than an average tensile strength of the compacted asphalt paving material formed of the aggregate and the asphalt binder having no oxidized polyolefin.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
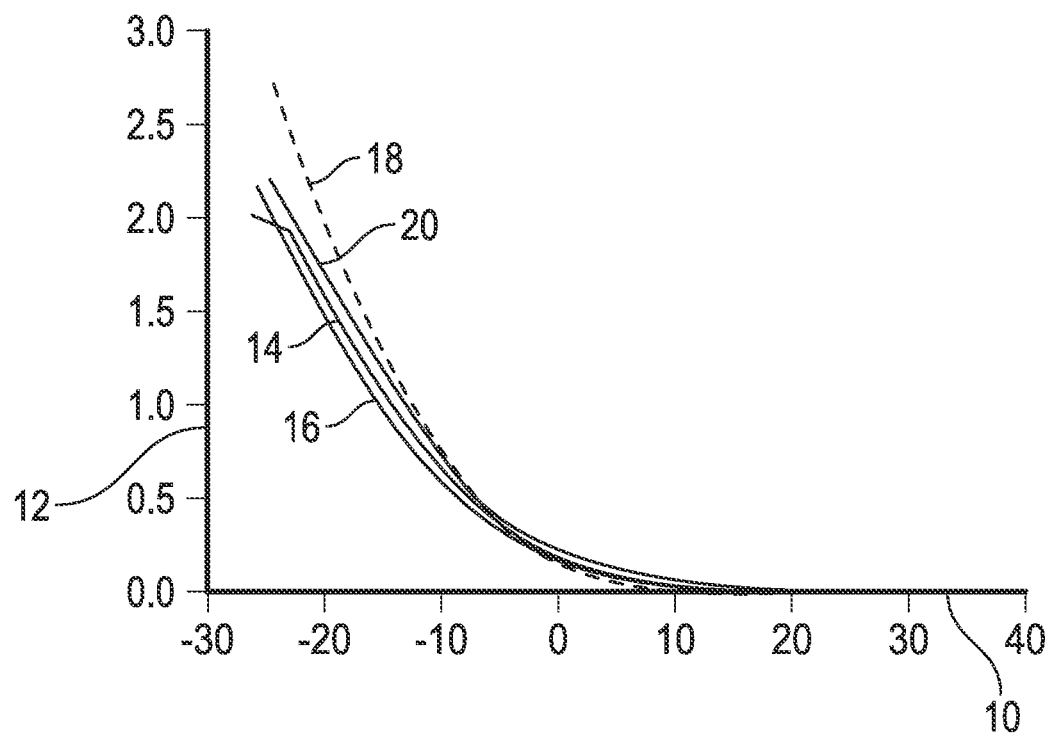
FIG. 1 is a graph illustrating the effect of oxidized polyolefin on the relationship between thermal stress and temperature of asphalt paving materials in accordance with exemplary embodiments.

The following detailed description is merely exemplary in nature and is not intended to limit the various embodiments or the application and uses thereof. Furthermore, there is no intention to be bound by any theory presented in the preceding background or the following detailed description.

The various embodiments contemplated herein relate to methods for reducing the thickness of asphalt paving material. In addition, various embodiments relate to methods for fabricating asphalt paving material with an increased number of aggregate-to-aggregate contact points. Further, methods are provided to fabricate asphalt paving materials with improved low temperature cracking performance. In an embodiment, the asphalt pavement thickness is reduced by utilizing an oxidized polyolefin with an asphalt to form a modified asphalt binder. The asphalt binder is combined with aggregate to form a hot asphalt paving material that is deposited overlying a substrate layer and compacted. The inventors have discovered that the oxidized polyolefin facilitates more efficient packing of the aggregates such that there are more aggregate-to-aggregate contact points, as characterized by either total number of contact points or total length of contact points per unit area. The good aggregate connectivity can improve both high temperature rutting and low temperature cracking properties of asphalt paving materials, as aggregates—the strongest components of the asphalt mixture—can better carry and distribute traffic load. As a result of the increased number of aggregate-to-aggregate contact points, the thickness of the layers, either base, binder, or wearing course, can be reduced substantially. The base course, being the thickest and thus most expensive, is especially suited for reduction of thickness. In addition, with increased aggregate-to-aggregate contact points, good thermal cracking performance is observed.

Asphalt is defined by the ASTM as a dark brown to black cementitious material in which the predominant constituents are bitumens that occur in nature or are obtained in petroleum processing. Asphalts characteristically contain saturates, aromatics, resins and asphaltenes. All types of asphalt, naturally occurring, synthetically manufactured and modified, may be used in accordance with the asphalt paving materials contemplated herein. Naturally occurring asphalt is inclusive of native rock asphalt, lake asphalt, and the like. Synthetically manufactured asphalt is often a byproduct of petroleum refining or post refining operations and includes air-blown asphalt, blended asphalt, cracked or residual asphalt, petroleum asphalt, propane asphalt, straight-run asphalt, thermal asphalt, and the like. Modified asphalt includes neat asphalt (e.g., unmodified asphalt that can be naturally occurring or synthetically manufactured) modified with elastomers, phosphoric acid, polyphosphoric acid, plastomers, ethylene/vinyl acetate copolymer, and the like, or various combinations of these modifiers. Non-limiting examples of elastomers suitable for modifying the neat asphalt include natural or synthetic rubbers including ground tire rubber, butyl rubber, styrene/butadiene rubber (SBR), styrene/ethylene/butadiene/styrene terpolymers (SEBS), polybutadiene, polyisoprene, ethylene/propylene/diene (EPDM) terpolymers, ethylene/n-butyl acrylate/glycidyl methacrylate terpolymers, and styrene/conjugated diene block or random copolymers, such as, for example, styrene/butadiene including styrene/butadiene/styrene copolymer (SBS), styrene/isoprene, and styrene/isoprene-butadiene block copolymer. The block copolymers may be branched or linear and may be a diblock, triblock, tetrablock or multi-block.

In an embodiment, the oxidized polyolefin is an oxidized polyethylene. The polyethylene can be a low density polyethylene (defined as polyethylene with a density of about 0.91 to about 0.935 gm/cm$^3$), a linear low density polyethylene (defined as polyethylene with a density of about 0.91 to about 0.93 gm/cm$^3$), a high density polyethylene (defined as polyethylene with a density of about 0.94 to about 0.97 gm/cm$^3$), a medium density polyethylene (defined as polyethylene with a density of about 0.925 to about 0.94 gm/cm$^3$), and the like. In one example, the oxidized polyolefin is an oxidized polyethylene homopolymer. In another example, the oxidized polyolefin is an oxidized high density polyethylene having a density of from about 0.93 to about 1 g/cc. A suitable oxidized polyolefin is Honeywell Titan™ 7686 oxidized high-density polyethylene homopolymer, manufactured by Honeywell International Inc., which is headquartered in Morristown, N.J. In an embodiment, the oxidized polyolefin is present in an asphalt binder in an amount of about 0.25 to about 10 weight percent (wt. %), for example, about 1 to about 4 wt. % based on the total weight of the asphalt binder. In another embodiment, the oxidized polyolefin is present in an asphalt binder in an amount of about 0.5 to about 2 wt. % and SBS is present in the asphalt binder in an amount of about 2 wt. % based on the total weight of the asphalt binder.

In an exemplary embodiment, the oxidized polyolefin has a weight average molecular weight (Mw) of from about 1000 to about 30,000 Daltons, such as from about 1000 to about 10,000 Daltons. Further, the degree of oxidation, e.g., carboxyl group content, of the oxidized polyolefin may be characterized by titrating a hot xylenes solution of the oxidized polymer with a 0.1 N alcoholic potassium hydroxide (KOH) solution to a visual "pink" end point using phenolphthalein as an indicator to determine the total acid content or acid number of the oxidized polyolefin. The oxidized polyolefin, for example, has an acid number of from about 5 to about 50 (e.g. acid value of about 5 to about 50 mg KOH/g), such as from about 15 to about 40 (e.g. acid value of about 15 to about 40 mg KOH/g).

The asphalt paving material also comprises aggregate. "Aggregate" is a collective term for mineral materials, such as, for example, sand, gravel, or crushed stone that are combined with the asphalt binder to form the asphalt paving material. The aggregate may comprise natural aggregate, manufactured aggregate, or a combination thereof. Natural aggregate is typically extracted rock from an open excavation (e.g. a quarry) that is reduced to usable sizes by mechanical crushing. Manufactured aggregate is typically a byproduct of other manufacturing processes such as slag from metallurgical processing (e.g. steel, tin, and copper production). Manufactured aggregate also includes specialty materials that are produced to have a particular physical characteristic not found in natural rock, such as, for example, low density. The gradation of the aggregates is carefully controlled in a hot mix design to optimize its performance Hot mix designs can be categorized in "dense graded," Stone Matrix Asphalt (SMA), Open Graded Friction Course (OGFC) and the like based on the relative proportions of the aggregate sized. In an exemplary embodiment, about 3 to about 8 wt. % of the asphalt binder is mixed with about 92 to about 97 wt. % aggregate to form an asphalt paving material.

In an exemplary embodiment, the asphalt paving material consists essentially of asphalt binder and aggregate, and the asphalt binder consists essentially of base asphalt and oxidized polyolefin with substantially no typical anti-stripping agent. The term "substantially no anti-stripping agent" as used herein means the anti-stripping agent, if present, is not used in an amount that will meet industry standards resistance to moisture damage. Two such suitable tests for determining the resistance of an asphalt paving material to moisture damage are specified in AASHTO T-283 and ASTM D 4867 standard procedures. Various types of typical anti-stripping agents include amines such as polyamines and polyalkylenepolyamine, modified amines such as polyamines reacted with fatty acids, lime (CaO) including hydrated lime (Ca(OH)$_2$), phosphoric acid, acrylic polymer including styrene-acrylic polymer, or combinations and/or derivatives thereof. In an alternative embodiment, the asphalt binder may include additional anti-rutting polymers and/or additives and/or elastomers, such as, for example, SBS present in an amount of from about 0.5 to about 5 wt. % of the base asphalt.

In an exemplary embodiment, a method for preparing asphalt paving material as discussed in the foregoing paragraphs is provided. The method includes heating and drying aggregate at a temperature of from about 120 to about 190° C. In one example, the aggregate is heated and dried by conventional means, continuous or batch, such as, for example, in a drum-mixer by hot gases. Neat or modified asphalt (referred to as a "base asphalt") is heated separately from the aggregate to a liquid state at a temperature of from about 120 to about 190° C.

In one embodiment, oxidized polyolefin is added to the hot liquid base asphalt to form a hot liquid asphalt binder. The hot asphalt binder is then combined with the heated aggregate in the conventional continuous or batch operation where the asphalt binder and the aggregate are mixed at a temperature of from about 120 to about 190° C. to form a hot asphalt paving material. In an alternative embodiment, the oxidized polyolefin and the hot liquid base asphalt are added simultaneously, as separate streams, to the aggregate in a hot drum mixer and the components are mixed at a temperature of from about 120 to about 190° C. to form a hot asphalt paving material.

In another embodiment, the oxidized polyolefin is initially combined with the heated aggregate in the drum-mixer where the heated aggregate melts the oxidized polyolefin. In this embodiment, the conventional continuous or batch operation mixes the hot aggregate with the melting oxidized polyolefin such that the oxidized polyolefin coats the surface of the aggregate. The hot liquid asphalt is then combined with the oxidized polyolefin-coated aggregate in the drum-mixer and the combined ingredients are mixed at a temperature of from about 120 to about 190° C. to form a hot asphalt paving material. During the mixing process, the oxidized polyolefin transfers and/or diffuses from the aggregate into the hot liquid asphalt to form a continuous hot liquid asphalt binder phase. Alternatively, the oxidized polyolefin is added to the aggregates after the asphalt has been added to the aggregates. Other materials, such as cellulosic fiber, may optionally be added during or after the various mixing regimes described above. Next, the hot asphalt paving material is deposited on a substrate layer and compacted to the appropriate government authority's specification, typically about 3 to about 8% air voids, which translates to a predetermined thickness, discussed in more detail below. The substrate layer can be an aggregate layer, such as when the asphalt paving material is to be deposited as a base course, or the substrate layer can be a base course or a binder course, such as when the asphalt paving material is to be deposited as a binder course or a wearing course, respectively.

FIG. 1 illustrates the results of a low temperature cracking performance study of various asphalt paving materials. The effects of an oxidized polyolefin, in particular, an oxidized polyethylene, more particularly Honeywell Titan™ 7686 oxidized high-density polyethylene homopolymer (manufactured by Honeywell International Inc. headquartered in Morristown, N.J.), on thermal cracking of asphalt mixtures were evaluated in this study. A PG64-22 asphalt was used as the control asphalt and the base asphalt. The aggregate used to form the asphalt paving mixtures was granite aggregate from a prominent aggregate source in North Central Wisconsin. The amount of binder and gradation of the aggregates was that for a Wisconsin E-10 design; i.e., the road pavement was designed to withstand 10,000,000 Equivalent Single Axle Loads (ESALs) The maximum nominal aggregate size was 19.0 mm. In addition to the control asphalt binder, three modified binders were tested. The level of modification of the base asphalt was obtained by targeting a high temperature True Grade of 77+1° C. The levels of modification that met the criteria for the True Grade are:

(a) base asphalt+3.5 wt. % linear SBS=True Grade of 77.8° C.;
(b) base asphalt+4.0 wt. % Honeywell Titan™ 7686=True Grade of 76.6° C.;
(c) base asphalt+2.0 wt. % Honeywell Titan™ 7686+2.0 wt. % linear SBS=True Grade of 78.2° C.

The amount of SBS used in this hybrid formulation was determined by targeting an Elastic Recovery (ER) value (ASTM D-6084) using ductility bath of approximately 70%. To establish the level of SBS modification of the hybrid formulation, elastic recovery tests were performed on the base asphalt modified with different levels of SBS. As indicated in Table 1, to meet the criteria of approximately ER=70%, a minimum SBS content of 2 wt. % by total binder weight is needed. Additional Honeywell Titan™ 7686 was then added to obtain a True Grade of 77+1° C.

TABLE 1

| Neat Binder | Additive | Replicate | Elastic Recovery (%) | Average of A and B |
|---|---|---|---|---|
| PG 64-22 | 2% SBS | A | 68.8 | 69.1 |
|  |  | B | 69.5 |  |
|  | 1% SBS | A | 55.0 | 53.8 |
|  |  | B | 52.5 |  |

An Asphalt Thermal Cracking Analyzer (ATCA) was used to measure the low temperature cracking performance of restrained and unrestrained samples. A summary of the cracking temperature and tensile strength in the restrained beams of a Thermal Stress Restrained Specimen Test is presented in Table 2. As illustrated in Table 2, Honeywell Titan™ 7686 mixtures have significantly higher tensile strength with respect to other mixtures. The cracking temperature is very similar for all mixtures (i.e., maximum difference is −1.8° C.). FIG. 1 shows typical thermal stress curves for the modified mixtures, where the x-axis 10 indicates the temperature in (° C.) and the y-axis 12 indicates the thermal stress in megapascals (MPa). The thermal stress curve for the paving material formed from the PG64-22 asphalt binder is represented by curve 14, the thermal stress curve of the asphalt paving material formed from the asphalt binder modified by SBS is represented by curve 16, the thermal stress curve of the asphalt paving material formed by the asphalt binder modified by Honeywell Titan™ 7686 is represented by curve 18, and the thermal stress curve of the asphalt paving material formed by the hybrid asphalt binder, that is, the binder modified by both SBS and Honeywell Titan™ 7686, is represented by curve 20.

TABLE 2

| Mix | Average Tensile Strength (MPa) | St. Dev. | CV (%) | Cracking Temperature (° C.) | St. Dev. | CV (%) |
|---|---|---|---|---|---|---|
| Control | 1.85 | 0.01 | 0.5 | −26.6 | 2.74 | 10.3 |
| SBS | 2.10 | 0.09 | 4.2 | −24.8 | 1.57 | 6.3 |
| 7686 | 2.71 | 0.03 | 1.2 | −24.7 | 0.10 | 0.4 |
| Hybrid | 2.13 | 0.10 | 4.7 | −26.0 | 1.63 | 6.3 |

Figure 2:
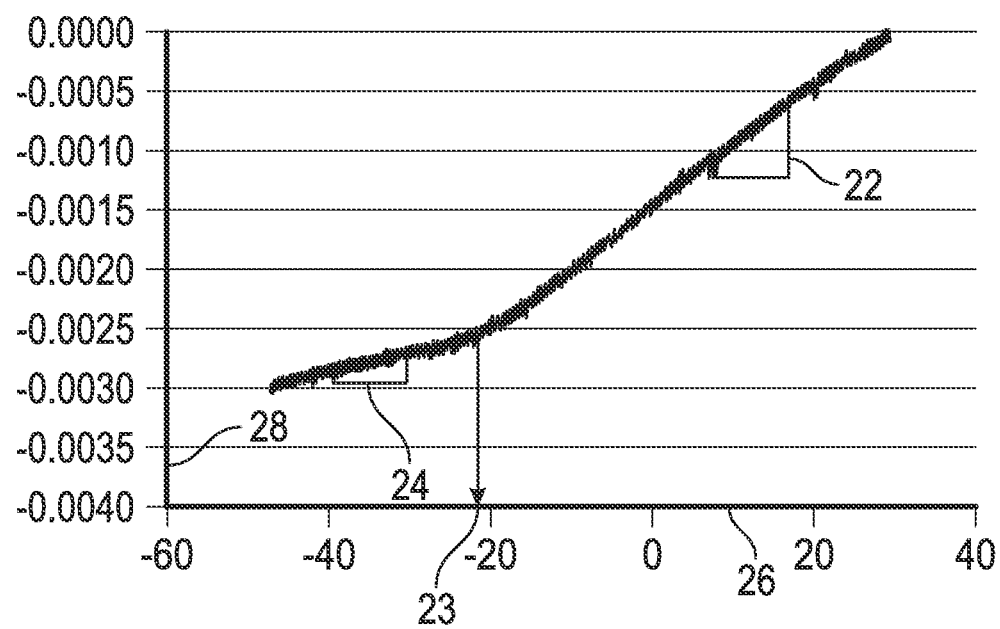
FIG. 2 is a graph showing the relationship between glass transition temperature (Tg), coefficient of thermal expansion/contraction ($\alpha_1$) above the transition region, and coefficient of thermal expansion/contraction ($\alpha_g$) below the transition region for a conventional asphalt paving material.

A typical thermo-volumetric response (i.e., glass transition (Tg) 23 and coefficients of thermal contraction/expansion) of asphalt mixtures is presented in FIG. 2, where the x-axis 26 indicates temperature in (° C.) and the y-axis 28 indicates thermal strain in millimeters/millimeters (mm/mm) The three parameters obtained in this test were:
(a) the glass transition temperature (Tg) 23, which indicates the temperature where the asphalt mixture transitions from a "liquid or rubber" to a "glassy" state;
(b) The coefficient of thermal expansion/contraction ($\alpha_l$) 22 above the transition region, and
(c) The coefficient of thermal expansion/contraction ($\alpha_g$) 24 below the transition region.

Table 3 includes the summary of the Tg tests conducted on two replicates for each asphalt mixture. Generally, good thermal cracking performance is observed for mixes with low Tg and $\alpha_l$.

TABLE 3

| Sample | $T_g$ Mean | CV (%) | $\alpha_l$ Mean | CV (%) | $\alpha_g$ Mean | CV (%) | Ave # of Contacts |
|---|---|---|---|---|---|---|---|
| Control | −22 | 2.8 | 5.84E−05 | 7.1 | 1.46E−05 | 24.5 | 2532 |
| 7686 | −21 | 4.3 | 5.42E−05 | 6.5 | 1.18E−05 | 7.9 | 2819 |
| SBS | −20 | 3.6 | 5.63E−05 | 7.7 | 1.42E−05 | 9.2 | 2608 |
| Hybrid | −27 | 9.4 | 4.75E−05 | 14.5 | 1.27E−05 | 16.1 | 3265 |

Figure 3:
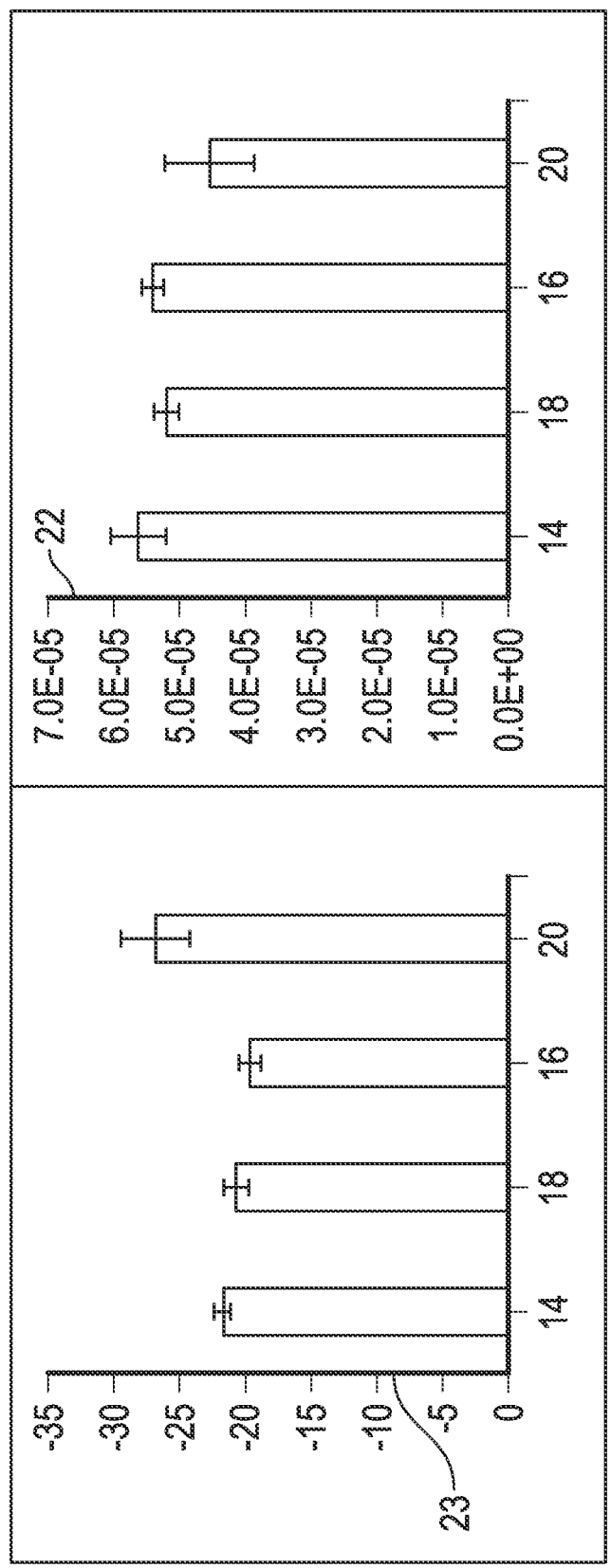
FIG. 3 is two graphs illustrating the effect of oxidized polyolefin on the Tg and $\alpha_1$ of asphalt paving materials in accordance with exemplary embodiments.

FIG. 3 illustrates the average for Tg 23 and $\alpha_l$ 22 for all mixes, where the x-axis indicates asphalt paving material with binders PG64-22 14, SBS 16, Honeywell Titan™ 7686 18, and the hybrid binder 20. It can be seen that generally paving materials with the control binder, and the binders with Honeywell Titan™ 7686 and SBS have very similar thermo-volumetric properties. However, the hybrid sample with SBS and Honeywell Titan™ 7686 has different Tg and $\alpha_l$. Table 3 indicates that the hybrid mix has significantly higher number of contact points between aggregates and thus has the lowest $\alpha_l$.

Figure 4:
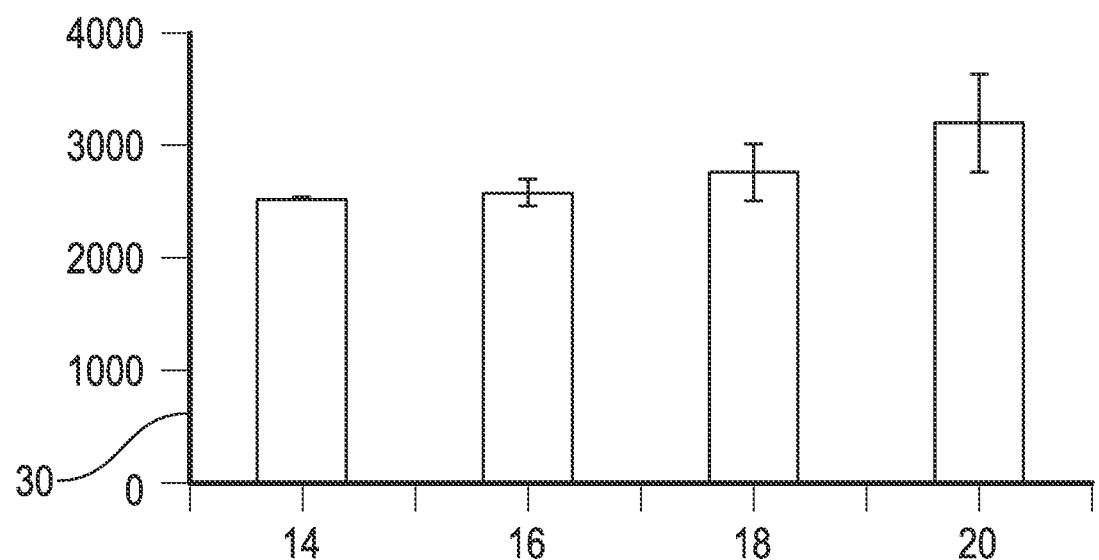
FIG. 4 is a graph illustrating the effect of oxidized polyolefin on the number of aggregate-to-aggregate contact points of asphalt paving materials in accordance with exemplary embodiments.
Figure 5:
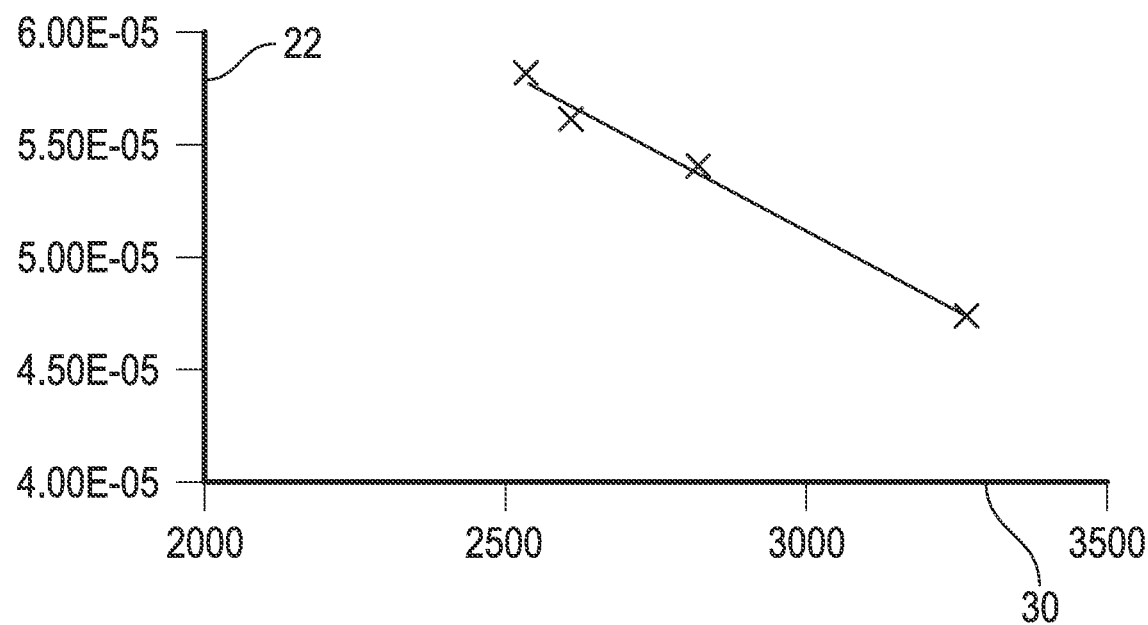
FIG. 5 is a graph illustrating the relationship between $\alpha_1$ and the number of aggregate-to-aggregate contact points of asphalt paving materials in accordance with exemplary embodiments.

FIG. 4 illustrates the results of a study to determine the effects of oxidized polyolefin on the number of aggregate-to-aggregate contact points of asphalt paving materials. The same control and three samples identified above were used in this study. The number of aggregate-to-aggregate contact points was calculated using digital images of the samples and iPas$^2$ software developed at the University of Wisconsin, Madison. FIG. 4, where the y-axis 30 represents the number of aggregate-to-aggregate contact points, demonstrates that the hybrid sample 20 had the highest average number of contact points. FIG. 5 shows that as the number of aggregate-to-aggregate contact points 30 increases, the $\alpha_l$ 22 of the asphalt paving materials decreases.

A further analysis was conducted to determine the effect of the oxidized polyolefin on asphalt paving material thickness. The comparison was conducted so as to result in the same rutting and alligator cracking amongst the samples. Mechanistic Empirical Pavement Design Guide (MEPDG) software, available from the National Cooperative Highway Research Program, was used to simulate pavement performance based on Level 1 analysis with input of previously measured material properties (Dynamic Modulus [E*] and binder G* and phase angle at three temperatures from DSR measurements). The pavement project location was selected as Clemson, S.C. with an average annual daily truck traffic (AADTT) of 4500 and a design life of 10 years. A total of 16 simulations were performed. The following parameters were used in the simulations:
Layer 1: Asphalt Concrete height: 7.62 cm (3.0 inches), 10.16 cm (4.0 inches), 12.7 cm (5.0 inches), 15.24 cm (6.0 inches)
Layer 2: A-1-a, 15.24 cm (6 inches)
Resilient Modulus (Mr)=2812.9 kg/cm$^2$ (40000 psi)
Layer 3: A-2-5, 22.86 cm (9 inches)
Mr=1969.1 kg/cm$^2$ (28000 psi)
Layer 4: A-7-6, last layer (indefinite thickness)
Mr=703.23 kg/cm$^2$ (10000 psi)

Figure 6:
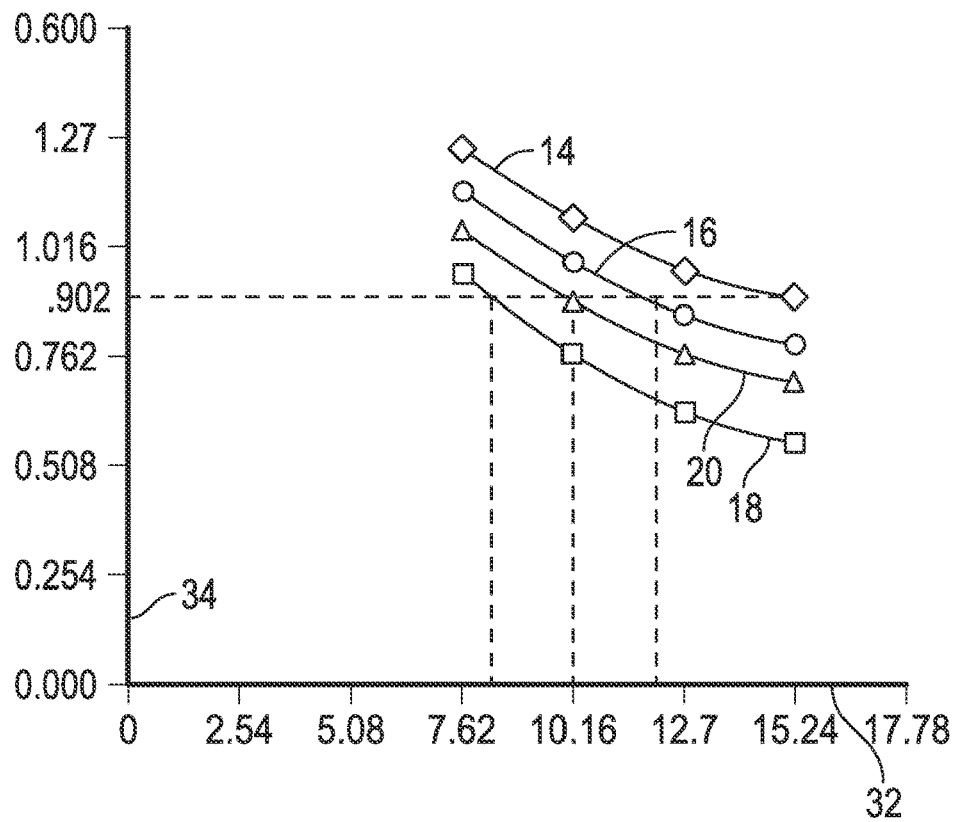
FIG. 6 is a graph showing the effect of oxidized polyolefin on the rutting of asphalt paving materials in accordance with exemplary embodiments.

Table 4 and FIG. 6 show the results of the sensitivity analysis of rutting to thickness using MEPDG and different modified paving materials. In FIG. 6, the x-axis 32 represents the thickness of the asphalt paving materials in centimeters and the y-axis 34 represents the asphalt paving material rutting in centimeters. It can be seen that the thickness of the asphalt paving materials with Honeywell Titan™ 7686, hybrid and SBS can be reduced by 6.86, 5.08 and 3.18 centimeters, respectively, if the asphalt paving materials rutting for the control sample at height of 15.24 centimeters is selected as the base value.

TABLE 4

AC Rutting (cm)

| Thickness (cm) | Control | 7687 | Hybrid | SBS |
|---|---|---|---|---|
| 7.62 | 1.25 | 0.960 | 1.059 | 1.151 |
| 10.16 | 1.092 | 0.775 | 0.899 | 0.991 |
| 12.7 | 0.970 | 0.640 | 0.777 | 0.871 |
| 15.24 | 0.902 | 0.569 | 0.709 | 0.800 |

Figure 7:
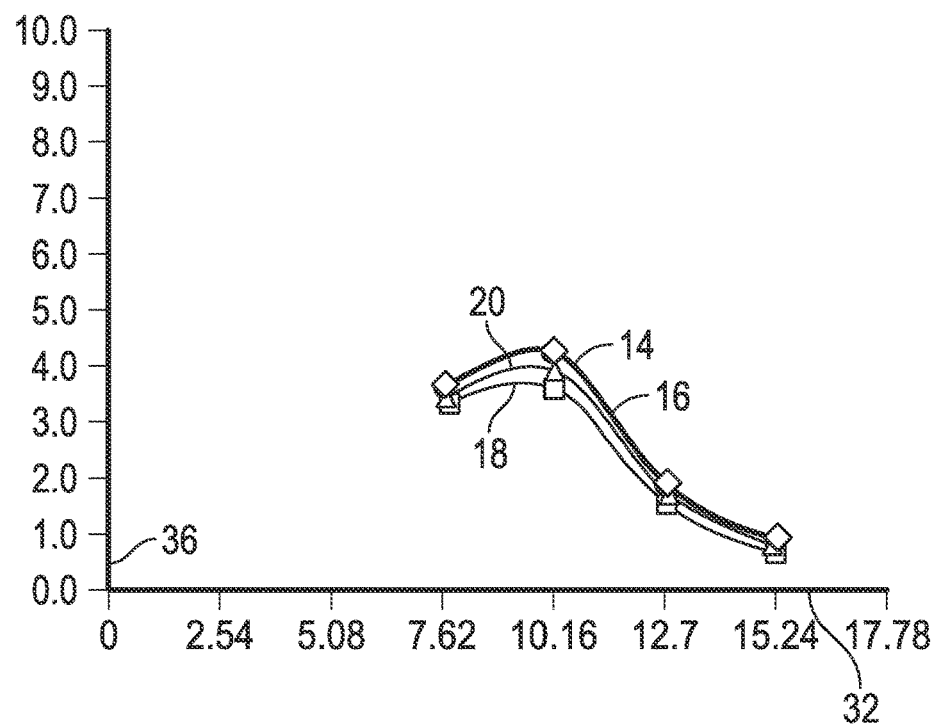
FIG. 7 is a graph showing the effect of oxidized polyolefin on the alligator cracking of asphalt paving materials in accordance with exemplary embodiments.

By reducing the asphalt paving material thickness for modified mixtures to match asphalt paving material rutting performance of the control sample, alligator cracking (i.e., fatigue cracking) can be affected. Table 5 and FIG. 7 illustrate the results for the thickness sensitivity analysis for alligator cracking. In FIG. 7, the x-axis represents the asphalt paving material thickness 32 in centimeters and the y-axis represents the percent of alligator cracking 36. MEPDG protocol considers fatigue failure when alligator cracking is greater than 25%. Therefore, even though by reducing the asphalt mixture thickness for the modified asphalt paving material, alligator cracking increases slightly, the magnitude for this distress is well below the limit and changes with respect to thicknesses analyzed are not significant.

TABLE 5

Alligator Cracking (%)

| Thickness (cm) | Control | 7686 | Hybrid | SBS |
|---|---|---|---|---|
| 7.62 | 3.75 | 3.45 | 3.51 | 3.74 |
| 10.16 | 4.34 | 3.65 | 4.01 | 4.30 |
| 12.7 | 2.02 | 1.58 | 1.83 | 1.98 |
| 15.24 | 1.01 | 0.76 | 0.90 | 0.98 |

The amount of oxidized polyolefin can be reduced in the hybrid (SBS+oxidized polyolefin) formulations and still produce higher contact point/contact lengths versus SBS only. This is demonstrated in the Table 6, where the addition of only 0.5 wt. % of the oxidized polyolefin to 2% SBS in the binder provides more contact points/lengths in the hot mix than the formulation containing only 3% SBS. The table also demonstrates that only 2 wt. % of the oxidized polyolefin produces similar contact points/lengths than 3.5% in the SBS formulation.

TABLE 6

| Mix | Normalized No. of Contact Points | | Normalized Total Contact Length | |
|---|---|---|---|---|
| | Ave. | Std. Dev. | Ave. | Std. Dev. |
| Control (PG 64-22) | 3368 | 192 | 1893 | 128 |
| PG 64-22 + 1% Honeywell Titan ™ 7686 | 3177 | 110 | 2474 | 248 |
| PG 64-22 + 2% Honeywell Titan ™ 7686 | 3747 | 299 | 2712 | 197 |
| PG 64-22 + 4% Honeywell Titan ™ 7686 | 4394 | 65 | 3112 | 174 |
| PG 64-22 + 2% SBS + 0.5% Honeywell Titan ™ 7686 | 5218 | 254 | 3374 | 254 |
| PG 64-22 + 2% SBS + 1% Honeywell Titan ™ 7686 | 5955 | 226 | 4132 | 115 |

TABLE 6-continued

| Mix | Normalized No. of Contact Points | | Normalized Total Contact Length | |
|---|---|---|---|---|
| | Ave. | Std. Dev. | Ave. | Std. Dev. |
| PG 64-22 + 2% SBS + 2% Honeywell Titan ™ 7686 | 5946 | 191 | 4417 | 215 |
| PG 64-22 + 3.5% SBS | 4108 | 355 | 2700 | 239 |

Accordingly, methods for reducing the thickness of asphalt pavement, methods for fabricating asphalt paving material with increased aggregate-to-aggregate contact points, and methods for fabricating asphalt paving materials with improved low temperature cracking performance have been described. In an embodiment, an asphalt is combined with an oxidized polyolefin forming an asphalt binder, which in turn is combined with aggregates. The oxidized polyolefin facilitates more efficient packing of the aggregates such that more aggregate-to-aggregate contact points are achieved. The good aggregate connectivity improves both high temperature rutting and low temperature cracking properties of asphalt paving materials. In addition, as a result of this increased aggregate-to-aggregate contact points, the thickness of the asphalt paving material can be reduced substantially and good thermal cracking performance is observed.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for producing thin asphalt pavement, the method comprising the steps of:
   combining a base asphalt, an oxidized polyolefin, and an aggregate to form an asphalt paving material;
   establishing, at a predetermined thickness, a high temperature rutting measurement of a comparative compacted asphalt paving material comprising the aggregate and the base asphalt with no oxidized polyolefin; and
   depositing a layer of the asphalt paving material on a substrate layer and compacting the asphalt paving material to a thickness that is less than the predetermined thickness of the comparative compacted asphalt paving material while achieving the same amount or less of high temperature rutting than the high temperature rutting measurement of the comparative compacted asphalt paving material.

2. The method of claim 1, wherein the oxidized polyolefin has a molecular weight of from about 1000 to about 30,000 Daltons.

3. The method of claim 1, wherein the oxidized polyolefin comprises oxidized polyethylene.

4. The method of claim 3, wherein the oxidized polyolefin is an oxidized polyethylene homopolymer.

5. The method of claim 4, wherein the oxidized polyethylene homopolymer is an oxidized high density polyethylene homopolymer having a density in the range of about 0.93 to about 1 g/cc.

6. The method of claim 4, wherein combining comprises mixing the base asphalt with the oxidized polyethylene homopolymer to form an asphalt binder with the oxidized polyethylene homopolymer present in an amount of about 0.25 to about 10 wt. % based on a total weight of the asphalt binder.

7. The method of claim 6, wherein combining comprises mixing the base asphalt with the oxidized polyethylene homopolymer to form an asphalt binder with the oxidized polyethylene homopolymer present in an amount of about 1 to about 4 wt. % based on a total weight of the asphalt binder.

8. The method of claim 4, wherein combining comprises mixing the base asphalt with the oxidized polyethylene homopolymer to form an asphalt binder with the oxidized polyethylene homopolymer present in an amount of about 0.5 to about 2 wt. % and SBS present in an amount of about 2 wt. % SBS based on a total weight of the asphalt binder.

9. The method of claim 1, wherein combining comprises mixing the base asphalt with the oxidized polyolefin to form an asphalt binder that comprises substantially no anti-stripping agent.

10. The method of claim 1, wherein depositing comprises depositing the layer of the asphalt paving material on the substrate layer and compacting to a thickness that is less than a thickness of the comparative compacted asphalt paving material while achieving less than 25% alligator cracking.

\* \* \* \* \*